Nov. 20, 1962  M. F. TANGJERD  3,064,993

STEERING ADJUSTING ASSEMBLY

Filed June 10, 1960 2 Sheets-Sheet 1

Maurice F. Tangjerd
INVENTOR.

BY *Clarence A. O'Brien*
*and Harvey B. Jacobson*
Attorneys

Nov. 20, 1962  M. F. TANGJERD  3,064,993
STEERING ADJUSTING ASSEMBLY
Filed June 10, 1960  2 Sheets-Sheet 2
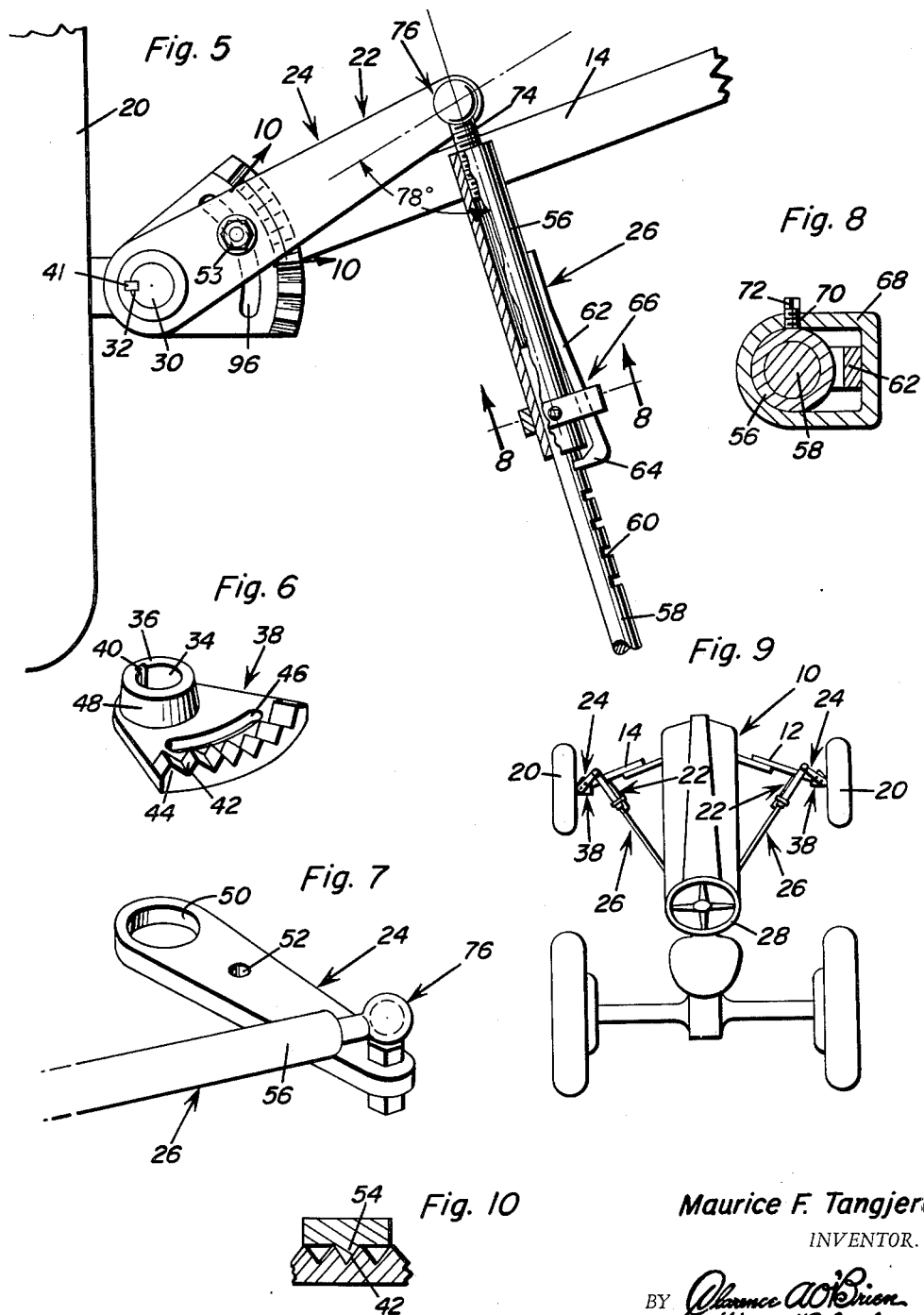
Maurice F. Tangjerd
INVENTOR.

United States Patent Office 3,064,993
Patented Nov. 20, 1962

3,064,993
STEERING ADJUSTING ASSEMBLY
Maurice F. Tangjerd, Bagley, Minn., assignor of fifty percent to Alvin Highberg, Bagley, Minn.
Filed June 10, 1960, Ser. No. 35,227
3 Claims. (Cl. 280—93)

This invention relates to a novel and useful steering adjusting assembly, and more particularly to an adjusting assembly for the steering mechanism of a farm tractor.

Because of the particular arrangement and angular relationship of the spindle arms and drag links of conventional forms of farm tractors equipped with extensible front axle members, a pair of spindle arms and a pair of drag links for pivoting the front wheel assemblies of the tractor, the two front wheels of the tractor, when the axle members are in a retracted position, will be disposed in parallel relation when directed in a straight forward position and will assume a right angled position relative to the focal point of the tractor while the latter is executing a turn. However, when the front axle members are in an extended position, the angular relationship of the spindle arms and drag links is such that the outside wheel is turned more than the inside wheel. That is to say, when the extensible front axle members are in a retracted normal width position and the tractor is executing a turn, the inside wheel will be turned slightly sharper than the outside wheel to compensate for the fact that the inside wheel travels in a smaller circle than the outside wheel. When the axle members are in an extended position, the change in the angular relationship of the spindle arms and drag links, when the tractor is executing a turn, rotates the inside wheel less than the outside wheel which positioning is exactly opposite from that which is desired. This undesirable feature is present in substantially every type of conventional farm tractor having extensible front axle members.

Heretofore, there has been no convenient or economical manner in which to overcome this undesirable feature and it is therefore the main object of this invention to provide a steering adjusting assembly for farm tractors of the type having extensible front axle members whereby the steering linkage may be readily adjusted for various width front axles to insure that each of the front wheels of the tractor may be rotated the correct amount relative to the other front wheel while the tractor is executing turns of varying degrees.

A further object of this invention, in accordance with the immediately preceding object, is to provide a steering adjusting assembly which may be properly adjusted for each individual width adjustment of the front axle members of the tractor.

Still another object of this invention, in accordance with the preceding objects, is to provide a steering adjusting assembly which may be readily applied to existing farm tractors.

A final object to be specifically enumerated herein is to provide a steering adjusting assembly which may be readily incorporated in farm tractors during the manufacturing process or applied thereto as a replacement assembly and which will conform to conventional forms of manufacture, be of simple construction and easy to adjust so as to provide a device that may be conveniently applied to all types of farm tractors, and economically feasible as well as long lasting and simple to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a fragmentary enlarged top plan view of the steering adjusting assembly comprising the present invention shown mounted upon a front wheel assembly of a tractor, parts of the steering adjusting assembly being broken away and shown in section;

FIGURE 6 is a perspective view of the selector plate of the steering adjusting assembly;

FIGURE 7 is a perspective view of the extensible drag link and spindle arm of the steering adjusting assembly;

FIGURE 8 is a vertical sectional view on somewhat of an enlarged scale taken substantially upon the plane indicated by the section line 8—8 of FIGURE 5;

FIGURE 9 is a top plan view of a conventional type of farm tractor with the steering adjusting assembly of the instant invention shown mounted thereon; and FIGURE 10 is a fragmentary vertical sectional view taken substantially upon the plane indicated by the section line 10—10 of FIGURE 5.

Referring now more specifically to the drawings the numeral 10 generally designates a conventional form of farm tractor having extensible front axle members 12 and 14, see FIGURES 1 through 4.

Figure 1:
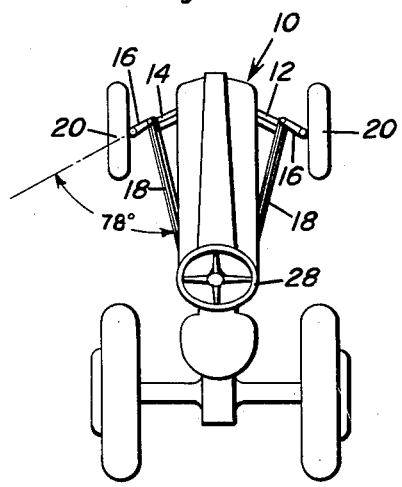
FIGURE 1 is a top plan view of a conventional type of farm tractor having extensible front axle members and with the front axle members in a retracted position and the front wheel assemblies rotated to a straight forward position.

In FIGURE 1 the tractor 10 is illustrated with the front axle members 12 and 14 in a retracted position and it will be noted that the occluded angle formed by the spindle arms 16 and the drag links 18 is approximately 78° when the front wheel assemblies 20 are positioned to move the tractor in a straight line.

Figure 2:
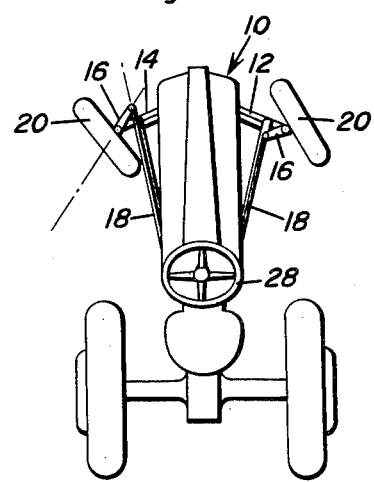
FIGURE 2 is a top plan view similar to that of FIGURE 1 but with the front wheels rotated to a position whereby the tractor will turn sharply to the left clearly illustrating the manner in which the inside wheel is rotated a greater amount than the outside wheel.

In FIGURE 2 of the drawings the wheel assemblies 20 are pivoted in a direction to turn the tractor 10 sharply to the left and it will be noted that the inside wheel assembly is rotated slightly more than the outside wheel assembly 20. The inside and outside wheel assemblies 20 are each disposed at substantially right angles to the center turning point of the tractor 10. Inasmuch as the inside wheel assembly 20 travels in a smaller circle than the outside wheel assembly 20, it is important that the inside wheel assembly 20 be rotated slightly more than the outside wheel assembly 20 in order to avoid what is commonly called "jackknifing."

Figure 3:
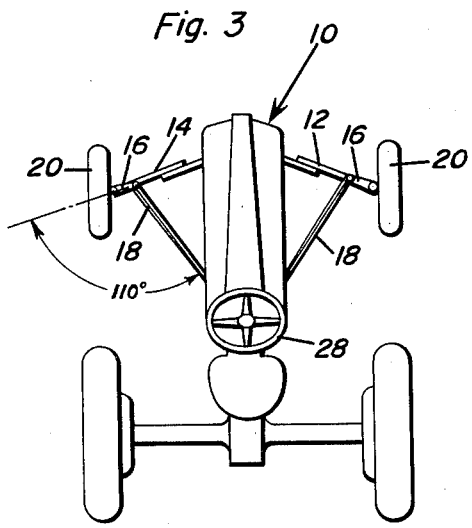
FIGURE 3 is a top plan view of a tractor similar to that of FIGURE 1 but with the extensible front axle members in an extended position.
Figure 4:
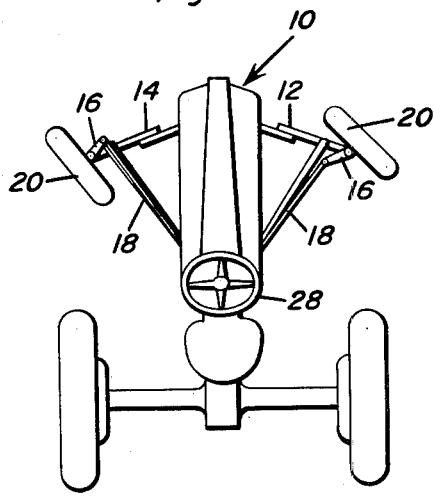
FIGURE 4 is a top plan view of a conventional type of farm tractor similar to that of FIGURE 3 but showing the front wheels rotated to turn the tractor sharply to the left and clearly illustrating the manner in which the inside wheel of a conventional tractor while executing a turn with the axle members in an extended position is rotated less than the outside wheel.

With attention directed more particularly to FIGURES 3 and 4 of the drawings, it will be noted that in FIGURE 3 the front axle members 12 and 14 are positioned in an extended position. When the axle members 12 and 14 are extended as illustrated, the occluded angle formed by the spindle arms 16 and the drag links 18 has increased to approximately 110°. With the spindle arms and drag links disposed in this manner when the front wheels are directed straight forward, when the wheel assemblies 20 are pivoted to turn the tractor 10 sharply to the left as illustrated in FIGURE 4 of the drawings, the inside wheel 20 is rotated less than the outside wheel 20 whereby the inside wheel assembly 20 tends to travel through a larger circle than the outside wheel assembly 20 resulting in the above mentioned "jackknifing."

From a comparison of FIGURES 1 and 3 of the drawings it may be readily observed that the angular relationship of the spindle arms and drag links shown in FIGURE 1 could be achieved in the tractor assembly illustrated in FIGURE 3 if the ends of the spindle arms 16 connected to the drag links 18 could be rotated slightly forwardly and the length of the drag links 18 could be increased an amount to compensate for the proposed more forward positioning of the ends of the spindle arms 16 to which they are secured.

With attention directed more particular to FIGURES 5 through 10 of the drawings, the steering adjusting assembly comprising the present invention is generally designated by the reference numeral 22 and includes a replacement spindle arm generally referred to by the reference numeral 24 and a replacement drag link generally designated by the reference numeral 26. It is of course to be noted that a tractor would require two of the assemblies 22 but inasmuch as the pair required for each tractor are identical in construction, only one will hereinafter be more fully described.

Each of the wheel assemblies 20 includes an upstanding spindle 30 by which each of the wheel assemblies 20 may be rotated to turn the tractor 10. The spindle arms 16 are very similar in construction to the spindle arm 24 and are secured to the spindle 30 in any convenient manner whereby the outer end of the spindle arm 16 may be rotated to effect rotation of the associated wheel assembly 20 for which purpose there is provided the drag links 18 which are pivotally secured at one end to the free end at each of the spindle arms 16 and are operatively connected to the steering wheel 28 of the tractor 10 at the other end.

The spindle 30 is conical and is provided with a keyway 32 and is received in a conical bore 34 formed in the mounting journal 36 of a selector plate which is generally designated by the reference numeral 38. The bore 34 is also provided with a longitudinally extending keyway 40 and the keyways 32 and 40 are registerable to receive therein the key 41 whereby the selector plate 38 is fixedly secured to the spindle 30 for rotation therewith. The mounting journal 36 is formed at one end of the selector plate 38 and the other end is provided with detent means in the form of arcuately disposed recesses 42 and projections 44 which are alternately spaced. The arcuately disposed projections and recesses 44 and 42 have as their center point the axis of rotation of the selector plate 38 which is also provided with an arcuate slot 46 having the axis of rotation of the selector plate 38 as its center point.

The outer surface 48 of the mounting journal 36 is cylindrical and one end of the spindle arm 24 is rotatably journaled on the mounting journal 36 by means of a bore 50 rotatably receiving the mounting journal 36. The spindle arm 24 is apertured as at 52 intermediate its ends and the aperture 52 is registerable with the slot 46 throughout its entire length. A fastener such as threaded fastener 53 is secured through the aperture 52 in the slot 46 to retain the lug 54 formed on the lower surface of the spindle arm 24 in seated engagement within the selected recess 42. In this manner the spindle arm 24 is releasably and rigidly secured in adjusted rotated positions relative to the selector plate 38.

The drag link 26 is substantially the same as the drag links 18 but is provided with an extensible section intermediate its ends whereby its over-all length may be adjusted. The drag link 26 includes a tubular end portion 56 and a rod-like end portion 58. The rod-like end portion 58 is telescopically received within the tubular end portion 56 and a plurality of longitudinally spaced notches 60 are formed in the end portion 58. The tubular end portion 56 includes detent means engageable with the notches 60 in the form of a leaf spring 62 having an inturned lug 64 formed on one end. The other end of the leaf spring 62 is fixedly secured to the outer surfaces of the cylindrical end portion 56 in any convenient manner. Thus, it may be seen that the drag link 26 may be adjusted in length and maintained in adjusted position by seating the lug 64 in a selected notch 60. A clamp assembly generally referred to by the reference numeral 66 is disposed about the tubular portion 56 and is slidably disposed thereon and about the free end portion of the leaf spring 62 whereby outward movement of the leaf spring 62 relative to the end portion 58 of the drag link 26 may be prevented. The clamp assembly 66 includes a collar member 68 having a threaded bore 70 formed therethrough in which there is threadedly engaged a setscrew 72 for engagement with the cylindrical portion 56 of the drag link 26 whereby the collar 68 may be retained in adjusted position therealong.

The end of the tubular section 56 is internally threaded and has threadedly engaged therein a threaded shank portion 74 of a pivot assembly generally referred to by the reference numeral 76 by which the tubular end portion 56 of the drag link 26 is pivotally secured to the outer free end of the spindle arm 24.

The tractor 10 illustrated in FIGURE 9 is shown with a pair of steering adjusting assemblies 22 applied thereto. The wheel assemblies of the tractor 10 illustrated in FIGURE 9 are rotated to the straight forward position as are the wheel assemblies 20 in FIGURE 3 of the drawings, but it will be noted that the occluded angle formed by the spindle arms 24 and the drag links 26 in FIGURE 9 is substantially the same as the occluded angle formed by the spindle arms 16 and the drag links 18 illustrated in FIGURE 1 of the drawings. Thus, although the axle members 12 and 14 in FIGURE 9 of the drawings are in an extended position as they are in FIGURE 3 of the drawings, the angular relationship of the spindle arms and drag links of the tractor 10 illustrated in FIGURE 9 is substantially the same as the angular relationship of the spindle arms 16 and the drag links 18 illustrated in FIGURE 1 of the drawings wherein the front axle members 12 and 14 are in a retracted position.

Although the specific construction of the spindle arms 24 and the drag links 26 illustrated are deemed to be of simple design, it is to be understood that the invention herein resides in the provision of any convenient form of extensible drag links and spindle arms mounted for adjustable rotation relative to the associated spindles and that any convenient forms of construction may be utilized if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A steering adjusting assembly for a tractor of the type having a steering wheel and longitudinally extendible front axle members each including a spindle for engagement by one end of a spindle arm, said steering adjusting assembly including a selector plate adapted for rigid mounting on one of said spindles, a spindle arm having one end adapted for pivotal association with said one spindle and selector plate, means interlockingly interconnecting said spindle arm and said selector plate for maintaining the former in adjusted pivotal positions relative to said plate, an extendible drag link, means pivotally securing one end of said drag link to the other end of said spindle arm and the other end of said drag link being adapted to be operatively connected to the steering wheel of said tractor, said drag link being extendible and including means releasably and interlockingly securing the latter in a selected one of a plurality of predetermined extended positions, said interconnecting means including means releasably and rigidly securing said spindle arm in a selected one of a plurality of predetermined pivoted positions relative to said selector plate, said predetermined extended positions of said drag link each corresponding to a predetermined one of said pivoted positions of said spindle arm relative to said selector plate.

2. A steering adjusting assembly for a tractor of the type having a steering control actuator and extendible from axle members at least one of which includes a pivotal spindle for engagement by one end of a spindle arm, said steering adjusting assembly including a spindle arm, means on one end of said arm adapting the latter for releasable interlocked securement to said spindle in a selected one of a plurality of predetermined pivoted positions relative to said spindle, an extendible drag link including means releasably and interlockingly securing said drag link in a selected one of a plurality of predetermined extended positions, means pivotally securing one end of said drag to the other end of said spindle arm and the other end of said drag link including means adapted to be operatively connected to the steering control actuator of said tractor, at least some of said predetermined extended positions of said drag link each corresponding to a predetermined one of said predetermined pivoted positions of said spindle arm relative to said spindle.

3. A steering adjusting assembly for a tractor of the type having a steering control actuator and extendible front axle members at least one of which includes a pivotal spindle for engagement by one end of a spindle arm, said steering adjusting assembly comprising a spindle arm including adjustable securing means on one end adapted to be adjustably secured to said spindle in a selected one of a plurality of predetermined adjusted positions relative to said spindle, an extendible drag link, said adjustable securing means and said drag link including first and second rigid detent latch means respectively for releasably interlockingly securing said spindle arm in a selected one of a plurality of predetermined pivoted positions relative to said spindle and said drag link in a selected one of a plurality of predetermined extended positions respectively, at least some of said predetermined extended positions of said drag link each corresponding to a predetermined one of said predetermined pivoted positions of said spindle arm relative to said spindle.

References Cited in the file of this patent

UNITED STATES PATENTS

| | | |
|---|---|---|
| 1,633,151 | Winsor | June 21, 1927 |
| 2,209,804 | Ashley | July 30, 1940 |
| 2,750,199 | Hart | June 12, 1956 |
| 2,778,655 | Hautzenroeder | Jan. 22, 1957 |